United States Patent Office 3,466,285
Patented Sept. 9, 1969

3,466,285
3-HETEROCYCLICAMINO URACILS
Harvey M. Loux, Valley View, Hockessin, Del., assignor to E. I. du Pont de Nemours and Company, Wilmington, Del., a corporation of Delaware
No Drawing. Application Dec. 13, 1967, Ser. No. 690,077, which is a continuation-in-part of application Ser. No. 590,544, Oct. 31, 1966. Divided and this application Apr. 12, 1968, Ser. No. 721,055
Int. Cl. C07d 51/42
U.S. Cl. 260—256.4    6 Claims

ABSTRACT OF THE DISCLOSURE

Novel uracils of the following formula:

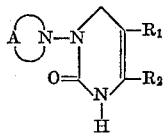

wherein $R_1$ and $R_2$ and

are as defined hereinafter are useful as herbicides.
Exemplary of such compounds is:
5-bromo-6-methyl-3-(1-piperidino) uracil.

CROSS REFERENCE TO RELATED APPLICATIONS

This application is a divisional of my copending application Ser. No. 690,077, filed Dec. 13, 1967, now U.S. Patent 3,397,050 which application is a continuation-in-part of my copending application Ser. No. 590,544, filed Oct. 31, 1966, now abandoned, which in turn is a continuation-in-part of my copending application Ser. No. 416,623, filed Dec. 7, 1964, now abandoned, which in turn is a continuation-in-part of my then copending application Ser. No. 159,768, filed Dec. 15, 1961, now abandoned.

BRIEF SUMMARY OF THE INVENTION

This invention relates to a novel class of uracils and to compositions and methods for using these uracils as herbicides.

The uracils of this invention are represented by the following formula:

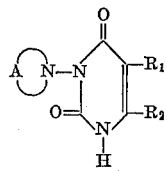

wherein:

is a cycloimino group selected from the group consisting of monocyclic heterocyclic groups containing from 3 through 8 ring atoms and bicyclic heterocyclic groups containing 7 through 12 ring atoms, provided the cycloimino group must contain one nitrogen atom bonding the group to the uracil nucleus, provided the group can have from 0 to 2 additional hetero atoms selected from the group consisting of oxygen, nitrogen and sulfur, and further provided the group can be substituted with a member selected from the group consisting of hydroxy, alkyl of 1 through 4 carbon atoms, and hydroxy alkyl of 1 through 4 carbon atoms;

$R_1$ is hydrogen, chlorine, bromine, fluorine, iodine, alkyl of 1 through 3 carbon atoms, hydroxymethyl or alkoxymethyl of 2 through 4 carbon atoms;

$R_2$ is methyl or ethyl; provided that $R_1$ and $R_2$ can be joined together as $(CH_2)_n$ where $n$ is an integer from 3 through 5.

In view of the ease of obtaining starting materials, preferred are the compounds where

is selected from the following groups: azacycloalkyl of 3 through 8 ring atoms, azacycloalkenyl of 5 through 7 ring atoms, azabicycloalkyl of 7 through 11 ring atoms, diazacycloalkyl of 5 through 8 ring atoms, azabicycloalkenyl of 9 through 11 ring atoms, azaoxacycloalkyl of 5 through 8 ring atoms, azaoxacycloalkenyl of 5 through 8 ring atoms, diazabicycloalkenyl of 7 through 11 ring atoms, azaoxabicycloalkyl of 8 through 10 ring atoms, azaoxabicycloalkenyl of 9 through 11 ring atoms, azadioxacycloalkyl of 5 through 9 ring atoms, azathiacycloalkyl of 5 through 7 ring atoms, azadithiacycloalkyl of 5 through 8 ring atoms, azathiacycloalkenyl of 5 through 7 ring atoms, azathiabicycloalkyl of 9 and 10 ring atoms, or azathiabicycloalkenyl of 9 and 10 ring atoms.

As previously set forth, these groups must have a nitrogen atom bonding the group to the uracil nucleus, can contain 1 or 2 additional hetero atoms, and can be substituted with hydroxy, alkyl of 1 through 4 carbon atoms, or hydroxyalkyl of 1 through 4 carbon atoms.

With respect to the above groups, it is of course understood that they can be named in other ways. Thus 1,3-diazabicyclo-(3.4.0)-nona-2,4,6,8-tetraen-1-yl, i.e., an azabicycloalkenyl group is conventionally termed 1-benzimidazolyl.

Most preferred are the compounds where

is azacycloalkyl of 5 through 7 ring atoms, azaoxacycloalkyl of 5 or 6 ring atoms, and azathiacycloalkyl of 5 or 6 ring atoms, the groups being substituted with from 0 through 4 methyl groups and contain 1 or 2 hetero atoms.

Exemplary of these compounds are:

5-bromo-6-methyl-3-(1-piperidino)uracil
5-chloro-6-methyl-3-(1-piperidino)uracil
5-bromo-6-methyl-3-(1-pyrrolidinyl)uracil
5-chloro-6-methyl-3-(1-pyrrolidinyl)uracil
5-bromo-6-methyl-3-(hexahydro-1-azepinyl)uracil
5-chloro-6-methyl-3-(hexahydro-1-azepinyl)uracil
6-methyl-3-(hexahydro-1-azepinyl)uracil
5-bromo-6-methyl-3-(4-morpholino)uracil
5,6-dimethyl-3-(1-piperidino)uracil The preferred derivatives of uracils of Formula 1 for purposes of the invention are salts formed with the cations sodium, potassium, and lithium. This is because these salts are readily soluble in water and can be applied as aqueous solutions.

In Formula 1, the

cycloimino group in the 3-position of the uracil ring can include but is not limited to such groups as

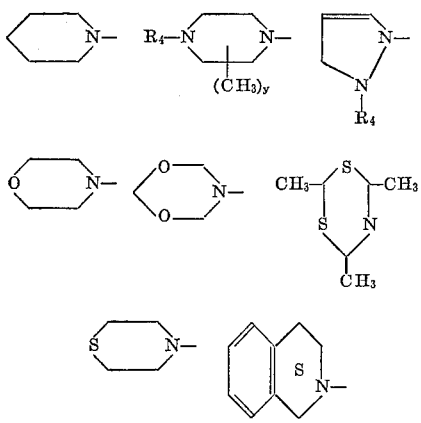

where $R_4$ is alkyl of 1 through 4 carbon atoms or —$CH_2CH_2OH$ and y is 0–4.

It is obvious from the above that the term "cycloimino" as used herein includes hetero atoms but it is intended in accordance with the invention that the number of hetero atoms in the

group of the 3-position of the uracil ring does not exceed three and can only be oxygen, nitrogen or sulfur.

DESCRIPTION OF THE INVENTION

A suitable method for preparing the uracils of the invention is illustrated by the following equations:

(2)
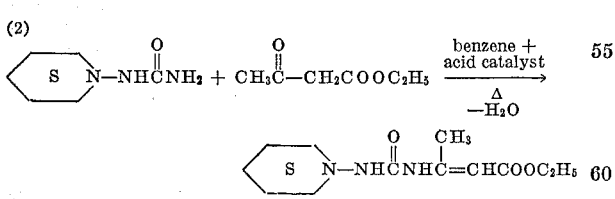

(3)
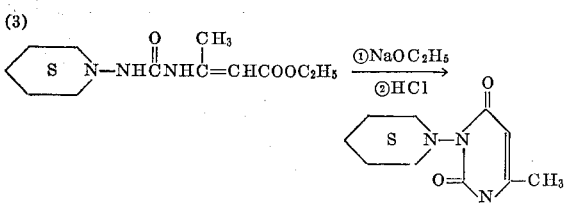

The semicarbazide used as a starting material in Equation 2 above can be prepared according to Ann., 221, 304 (1883) or Ber., 35, 4477 (1902).

The appropriately substituted urea is treated with a β-keto ester or an α-substituted β-keto ester substituted with such radicals as alkoxy, fluorine, or alkyl, and an acid catalyst, at reflux in a solvent from which water is removed continuously. After the water has all been removed, a methanolic solution of a base such as sodium methoxide is added. After a few minutes reflux, the reaction mixture is cooled and extracted with water. Upon acidification of the water layer, the desired product separates in crystalline form.

The product formed at the end of the first step, i.e., after the water has been removed, is a ureido compound. It can be isolated and purified if desired; however, this is neither necessary nor advantageous for the operation of step 2.

These ureido compounds referred to above are believed to exist in either or both of two tautomeric forms, as illustrated in the following equation:

(4)
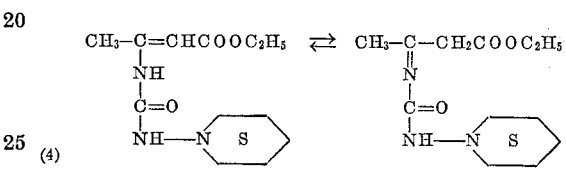

Uracils of this invention which are substituted in the 5-position with halogen and hydroxymethyl groups can be conveniently prepared in accordance with general methods heretofore described in the literature for related compounds.

For example, the preparation of those compounds having a halogen substituent in the 5-position is illustrated by Equation 5 below. For more general details, see J. Am. Chem. Soc. 61, 1015 (1939), Ann. 305, 314, Ann. 352, 242, and Ann. 441, 192. In the case of the chlorination, it is sometimes convenient to use sulfuryl chloride rather than chlorine.

(5)
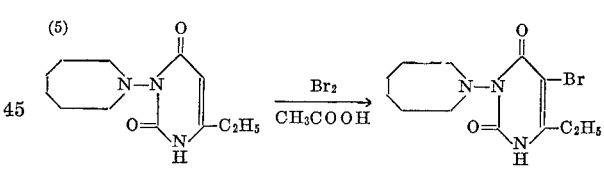

The reaction of uracils, which are not substituted in the 5-position, with formaldehyde leads to uracils substituted in the 5-position with a hydroxymethyl group as illustrated by Equation 6.

(6)
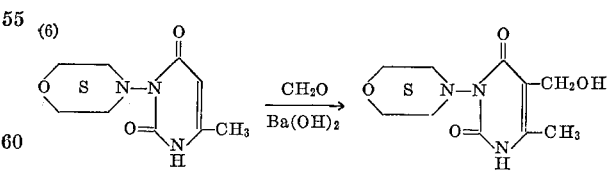

The metal salts of this invention are prepared by conventional methods such as dissolving the free uracil in an aqueous or nonaqueous solution of at least an equimolar amount of a base or basic salt contining the desired cation. For example, a sodium salt can be prepared by dissolving the uracil in water containing an equimolar amount of sodium hydroxide. The salt can then be isolated from the solution by removal of the water. The uracil salts which are not soluble in water can be best prepared by treating an aqueous solution of an alkali metal salt of the urcil with an aqueous solution of a water-soluble salt of the metal.

The quaternary ammonium salts of the compounds of Formula 1 are prepared by the reaction of the substituted uracil with an appropriate quaternary ammonium hydroxide. Since these hydroxides are generally available in solution, the reaction is most conveniently carried out in the same solvent. If the solvent-free salt is desired, it can be easily prepared by removing the solvent.

Alternately, the quaternary ammonium salts of the uracils can be prepared from the corresponding sodium salts in a dry inert solvent such as toluene or xylene. The appropriate quaternary ammonium halide is then added with stirring and, if necessary, mild heating. The sodium halide which forms is removed by filtration, leaving the quaternary ammonium salt of the uracil in solution. If desired, the solvent-free salt can be prepared by removing the solvent, preferably in vacuum.

Addition compounds of the uracils of Formula 1 with Lewis bases such as amines can be prepared by mixing together equimolar quantities of an appropriate uracil and a nitrogenous base. The mixture is gradually heated, with stirring, until a clear melt is formed. On cooling, the addition compound crystallizes. This product can then be recrystallized from a solvent such as benzene, cyclohexane, nitromethane or acetonitrile.

It is sometimes advantageous to use an inert solvent medium to carry out the reaction. Such a solvent moderates the reaction by acting as a heat sink, and allows better control of the reaction, especially if at is being carried out on a large scale. Suitable inert solvents are benzene, cyclohexane, nitromethane, acetonitrile and dioxane.

When an inert solvent is used, the addition compounds are prepared by dissolving the amine in the solvent and then adding the uracil gradually, with stirring. Stirring is continued for from ten minutes to two hours. Mild heating may be necessary. Some addition compounds precipitate and can be removed by filtration. Other addition compounds are isolated by evaporation of the solvent. The addition compounds prepared in this way are suitable for use without further purification, but can be purified by recrystallization if desired.

In some instances, the uracil and amine are highly soluble in the inert solvent, but the addition compound is not, and so it can be filtered off pure when the reaction is complete.

Complexes of the uracils of Formula 1 with a Lewis base such as phenol can be formed by comelting the uracil and phenol in a 1:1 to 2:1 (uracil:phenol) ratio. They can also be formed by codissolving the reactants, in the same ratio, in a solvent such as nitromethane or a mixture of nitromethane and cyclohexane. Process conditions and isolation procedures are the same as those described above for the addition compounds.

The uracil derivatives of this invention including the uracils of Formula 1 and their salts, addition compounds, and complexes have outstanding herbicidal effectiveness. They are particularly active as post-emergence sprays at levels of from about 2 to 40 pounds of active material per acre for the control of annual grasses and perennial grasses such as quackgrass, Johnsongrass, Bermudagrass, and nutsedge growing on railroad ballast, in industrial areas, or on and adjacent to crop land in agricultural areas. They are also useful for the post- and pre-emergence control of annual grass and broadleaf seedlings when used as a spray at a rate of about ¼ to 3 pounds per acre. Still another important use for the compounds of this invention is for pre-emergence and post-emergence control of a wide spectrum of weeds and brush on industrial and railroad ballast sites using levels of about 5 to 40 pounds of active material per acre.

In general, one uses the compounds of this invention at levels of at least about ¼ pound of active material per acre to obtain herbicidal effectiveness, the exact amount used being dependent upon the particular situation involved.

The compounds of this invention are preferably formulated with pest-control adjuvants, modifiers, or diluents, hereinafter generically called inert carriers. Formulation facilitates handling and often actually enhances herbicidal action. Such herbicidal formulations are prepared in the form of either powdered solids, granules, pellets, or liquids.

The liquid compositions, whether solutions or dispersions of the compounds of this invention in a liquid solvent, and also the wettable powders, contain as a conditioning agent one or more surface-active agents in amounts sufficient to render a given composition containing the compounds of this invention readily dispersible in water or in oil. By the term "surface-active agent" it is understood that wetting agents, dispersing agents, suspending agents, and emulsifying agents are included.

Surface active agents suitable for use in the compositions of this invention are set forth, for example, in Searle, U.S. Patent No. 2,426,417; Todd, U.S. Patent No. 2,655,-447; or Jones, U.S. Patent No. 2,412,510. See also Lenher et al., U.S. Patent No. 2,139,276. A detailed list of surface-active agents is set forth in an article in "Soap and Chemical Specialties," vol. 31, No. 7, pages 50–61; No. 8, pages 48–61; No. 9, pages 52–67; and No. 10, pages 38–67 (1955). See also McCutcheon in "Soap and Chemical Specialties," December 1957; January, February, March, 1958; and Bulletin E–607 of the Bureau of Entomology and Plant Quarantine of the U.S. Department of Agriculture.

In preparing herbicidal compositions, surface-active agents are generally employed at concentrations of from about 1–10% by weight. Levels as high as 0.5 to 6 parts for each part of uracil, however, give unusual and unexpected beneficial results. Such compositions have a greater herbicidal effectiveness than can be expected from a consideration of the activity of the components used separately.

Powdered or dust compositions of the invention, whether or not also modified with a surface-active agent, are prepared by mixing the active ingredient with finely divided inert solid carriers. Such carriers are preferably talcs, natural clays, pyrophyllite, diatomaceous earth, and flours such as walnut shell, wheat, redwood, soya bean, and cottonseed. Other inert solid carriers which can be used include magnesium and calcium carbonates, calcium phosphates, sulfur, lime, etc., either in powder or granular form. The percentage by weight of the active ingredient will vary according to the manner in which the composition is to be applied, but, in general, will be from about 0.5 to 95% by weight of the herbicidal composition.

Granule or pellet compositions can be prepared by mixing the active material in finely divided form with clays (with or without water-soluble binders), moistening the mixture with 15–20% water, extruding the mass under pressure through an orifice, then cutting the extrusions to size before drying to yield pellets or first drying, then granulating to yield granules. Alternatively, granules can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and suspended, a binder is needed to adhere the active material to the surface. The binder can be soluble such as goulac, or dextrin or colloidally soluble such as swollen starch, glue or polyvinyl alcohol. The final step in either case is to remove the liquid medium whether solvent or carrier.

Herbicidal compositions of this invention can also be prepared by dispersing the active ingredient in an inert non-aqueous carrier. Alphatic and aromatic hydrocarbons, for example, hydrocarbons of petroleum origin, are preferred as carriers. These dispersions are prepared by milling the uracil with dispersing agents and suspending agents and inert carriers in mills such as pebble mills. The amount of the herbicide in the dispersion may be from 10% or less to 48 and 50% of the oil despersion.

Preferably, the particles in such dispersions range from about 1 to 50 microns although the majority are preferably in the range of from about 5 to 20 microns in average diameters. In general, the oils used include aliphatic and aromatic hydrocarbons and mixtures thereof, particularly those derived from petroleum and having a boiling point in the range from about 125 to 400° C. A hydrocarbon oil having a lower boiling point should not be used because when sprayed from a nozzle, such a hydrocarbon tends to volatilize undesirably. Furthermore, low-boiling hydrocarbons present a serious fire hazard.

In some situations it is desirable that the active uracil herbicide be released slowly from the carrier. Such compositions are particularly useful for application to gravel and cinder drive-ways and the like, where they release their herbicidal ingredients slowly over a long period of time and thus eliminate the necessity for frequent application.

Such compositions are made by incorporating the uracil into a solid or semi-solid matrix of a material such as Portland cement or calcium sulfate. The uracils will be present in these compositions in varying concentrations depending upon the ultimate use of the products. Generally, they will contain from 1% to 40%, by weight, of uracil. They can be prepared by any of the well-known techniques, such as granulating or pelletizing.

Herbicidal formulations can also be prepared containing a fungicide or bactericide. When such compositions are applide to the soil, the fungicidal or bactericidal ingredients retard the breakdown of the uracils by soil microorganisms and thus renders them stable over a longer period of time. The fungicides and bactericides which can be incorporated into these compositions can be any of the well-known products such as, for example, antibiotics such as penicillin, phenols, thiocarbamates, and the like. The amount of microbiocide to be included in such compositions will naturally vary with their ultimate use. Generally, however, they will contain from 1% to 70% of a microbiocide.

The uracils of this invention can also be incorporated into paints, particularly marine paints, for appliction to surfaces where the growth of plants such as algae is undesirable. Such compositions are prepared by dissolving or suspending the uracil in a paint-compatible solvent. Uracils will be present in such compositions at concentrations of from 1% to 10%.

The uracils of this invention can also be dissolved in a suitable solvent or dispersed in a suitable carrier and impregnated into wooden objects such as consrtuction timbers or railroad ties. When these objects are placed in or near the ground, the uracils slowly leach from them, thus preventing the growth of weeds in the nearby areas.

Such wooden objects can also be floated on the surface of water in which undesirable aquatic growth is present. Again, the uracil is slowly leached from the wood and prevents growth of nearby aquatic weeds for extended periods.

The concentration of uracil to be impregnated into any such wooden object will vary according to the nature of the wood and the type of weed to be controlled.

Optionally, adhesives such as gelatin, blood albumin, resins, for example, rosin alkyl resins and the like can also be used in certain compositions to increase retention or tenacity of deposits following application.

The herbicidal compositions of this invention can be formulated to contain two or more of the uracils. They can also be formulated to contain other known herbicides in addition to the uracils.

Among the known herbicides which can be combined with the uracils of this invention are:

Substituted ureas 3-(3,4-dichlorophenyl)-1,1-dimethylurea
3-(4-chlorophenyl-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-methylurea
3-(3,4-dichlorophenyl)-1,1,3-trimethylurea
3-(3,4-dichlorophenyl)-1,1-diethylurea These ureas can be mixed with the uracils of this invention in proportions of from 1:4 to 4:1, respectively, the preferred ratio being 1:2 to 2:1.

Substituted triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine
2-diethylamino-4-isopropylacetamido-6-methoxy-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-trizine
2-methoxy-4,6-bis(ethylamino)-s-triazine
2-methoxy-4-ethylamino-6-isopropylamino-s-triazine
2-chloro-4,6-bis(isopropylamino)-s-triazine These triazines can be mixed with the uracils of this invention in proportions of from 1:4 to 4:1, respectively, the preferred ratio being 1:2 to 2:1.

Phenols

Dinitro-o-sec-butylphenol and its salts
Pentachlorophenol and its salts

These phenols can be mixed with the uracils of this invention in the proportions of 1:10 to 20:1, respectively, the preferred ratio being 1:5 to 5:1.

Carboxylic acids derivatives

These carboxylic acids and derivatives can be mixed with the uracils of this invention in the listed proportions.

2,3,6-trichlorobenzoic acid and its salts, 2,3,5,6-tetrachlorobenzoic acid and its salts, 2-methoxy-3,5,6-trichlorbenzoic acid and its salts, 2-methoxy-3,6-dichlorobenzoic acid and its salts, 3-amino-2,5-dichlorobenzoic acid and its salts, 3-nitro-2,5-dichlorobenzoic acid and its salts, 2,4-dichlorophenoxyacetic acid and its salts and esters, 2,4,5-trichlorophenoxyacetic acid and its salts and esters, (2-methyl-4-chlorophenoxy)acetic acid and its salts and esters, 2-(2,4,5-trichlorophenoxy)propionic acid and its salts and esters, 2-(2,4,5-trichlorophenoxy)ethyl-2,2-dichloroproionate, 4-(2,4-dichlorophenoxy)butyric acid and its salts and esters, 4-(2-methyl-4-chlorophenoxy)butyric acid and its salts and esters, mixed in a 1:16 to 8:1 ratio, preferably a 1:4 to 4:1 ratio.

2,6-dichlorobenzonitrile, mixed in a 1:4 to 4:1 ratio, preferably a 1:3 to 3:1 ratio.

Trichloroacetic acid and its salts, mixed in a 1:2 to 25:1 ratio, preferably a 1:1 to 8:1 ratio.

2,2-dichloropropionic acid and its salts, mixed in a 1:4 to 8:1 ratio, preferably a 1:2 to 4:1 ratio.

N,N-dipropylthiolcarbamic acid, ethyl ester, n-propyl-N,N-dipropylthiolcarbamate, N - propyl-N-ethyl-n-butyl-thiocarbamate, mixed in a 1:2 to 24:1 ratio, preferably a 1:1 to 12:1 ratio.

N-phenylcarbamic acid, isopropyl ester, N-(m-chlorophenyl)carbamic acid, isopropyl ester, N-(m-chlorophenyl)carbamic acid, 4-chloro-2-butynyl ester, mixed in a 1:2 to 24:1 ratio, preferably a 1:1 to 12:1 ratio.

2,3,6-trichlorophenylacetic acid and its salts, mixed in a 1:12 to 8:1 ratio, preferably a 1:4 to 4:1 ratio.

2-chloro-N,N-diallylacetamide, maleic hydrazide, mixed in a 1:2 to 10:1 ratio, preferably a 1:1 to 5:1 ratio.

Inorganic and mixed inorganic-organic salts

These salts can be mixed with the uracils of this invention in the listed proportions.

Calcium propylarsonate, disodium monomethylarsonate, octyl-dodecylammoniummethylarsonate, mixed in a 1:4 to 4:1 ratio, preferably a 1:2 to 2:1 ratio.

Sodium arsenite, mixed in a 1:5 to 40:1 ratio, preferably a 1:4 to 25:1 ratio.

Lead arsenate, calcium arsenate, mixed in a 150:1 to 600:1 ratio, preferably a 100:1 to 400:1 ratio.

Sodium tetraborate hydrated, granulated; sodium metaborate, sodium pentaborate, polyborchlorate, unrefined borate ore such as borascu, mixed in a 6:1 to 1500:1 ratio, preferably a 3:1 to 1000:1 ratio.

Sodium chlorate, mixed in a 2:1 to 40:1 ratio, preferably a 1:1 to 20:1 ratio.

Ammonium sulfamate, mixed in a 1:1 to 100:1 ratio, preferably a 1:1 to 50:1 ratio.

Other organic herbicides 5,6 - dihydro(4A,6A)-dipyrido-(1,2-A2',1'-C) pyrazinium dibromide, mixed in a 1:20 to 16:1 ratio, preferably a 1:5 to 5:1 ratio.

3-amino-1,2,4-triazole, mixed in a 1:20 to 20:1 ratio, preferably a 1:5 to 5:1 ratio.

3,6-endoxohexahydrophthalic acid, mixed in a 1:3 to 20:1 ratio, preferably a 1:2 to 10:1 ratio.

Hexachloroacetone, mixed in a 1:2 to 16:1 ratio, preferably a 1:1 to 8:1 ratio.

Diphenylacetonitrile, N-N-dimethyl-α,α-diphenylacetamide, N-N-di-n-propyl-2,6-dinitro-4-trifluoromethylaniline, N-N-di-n-propyl-2,6-dinitro-4-methylaniline, mixed in a 1:10 to 30:1 ratio, preferably a 1:5 to 20:1 ratio.

O-(2,4 - dichlorophenyl) - O - methyl - isopropylphosphoramidothiate, 2,3,5,6-tetrachloroterephthalic acid, dimethyl ester, mixed in a 1:4 to 20:1 ratio, preferably a 1:3 to 15:1 ratio.

Other substituted uracils

These uracils can be mixed with other substituted uracils, in the proportions listed below. Methods for the preparation of the listed uracils which are novel can be found in copending applications Ser. Nos. 233,952, filed Oct. 29, 1962; now U.S. Patent 3,235,361 and 232,311, filed Oct. 22, 1962 now U.S. Patent 3,235,360.

3-cyclohexyl-6-methyluracil
3-cyclohexyl-6-ethyluracil
3-cyclohexyl-6-sec-butyluracil
3-norbornyl-6-methyluracil
3-cyclopentyl-6-methyluracil
3-cyclohexyl-6-isopropyluracil Mixed in a 1:4 to 4:1 ratio, preferably a 1:2 to 2:1 ratio.

3-cyclohexyl-5,6-trimethyleneuracil
3-sec-butyl-5,6-trimethyleneuracil
3-isopropyl-5,6-trimethyleneuracil
3-isopropyl-5,6-tetramethyleneuracil
3-isopropyl-5,6-pentamethyleneuracil Mixed in a 1:6 to 6:1 ratio, preferably at 1:4 to 4:1 ratio.

3-cyclohexyl-5-bromouracil
3-cyclohexyl-5-chlorouracil
3-isopropyl-5-bromouracil
3-sec-butyl-5-bromouracil
3-sec-butyl-5-chlorouracil
5-bromo-3-sec-butyl-6-methyluracil
5-bromo-3-sec-butyl-6-methyluracil, sodium salt
5-chloro-3-sec-butyl-6-methyluracil
5-bromo-3-tert-butyl-6-methyluracil
5-chloro-3-tert-butyl-6-methyluracil
5-bromo-3-(1-ethylpropyl)-6-methyluracil
5-chloro-3-(1-ethylpropyl)-6-methyluracil
5-bromo-3-isopropyl-6-methyluracil
5-chloro-3-isopropyl-6-methyluracil
5-bromo-3-cyclohexylmethyl-6-methyluracil
5-chloro-3-cyclohexylmethy-6-methyluracil
3-cyclohexyl-5-methoxy-6-methyluracil
3-sec-butyl-5,6-dimethyluracil
5-bromo-6-methyl-3-norbornylmethyluracil
3-sec-butyl-6-methyl-5-nitrouracil
3-cyclohexyl-5,6-dimethyluracil
5-bromo-3-cyclohexyl-6-methyluracil
5-chloro-3-phenyl-6-methyluracil Mixed in a 1:6 to 6:1 ratio, preferably a 1:2 to 2:1 ratio.

3-isopropyl-1-trichloromethylthio-5-bromo-6-methyluracil
3-cyclohexyl-1-trichloromethylthio-5-bromo-6-methyluracil
3-sec-butyl-1-acetyl-5-bromo-6-methyluracil
3-isopropyl-1-acetyl-5-bromo-6-methyluracil
3-isopropyl-1-trichloromethylthio-5-chloro-6-methyluracil Mixed in a 1:4 to 4:1 ratio, preferably a 1:2 to 2:1 ratio.

The rate of application for compounds of this invention will, of course, vary with the particular end result desired, the particular use to which the compounds are put, the particular plant involved, the formulation used, the mode of application, the prevailing weather conditions, the foliage density, and the like. Since so many variables play a role, it is not possible to indicate generally a particular rate of application suitable for all situations. Certain particular usage rates that are found to be effective can be suggested, but it must be understood the determination of the optimum particular rate for use in any given instance is conventional procedure to those skilled in the art.

In order that the invention may be better understood, the following examples are given, wherein all parts and proportions are by weight unless otherwise indicated.

Example 1.—Preparation of 3-(hexahydro-1-azepinyl)-6-methyluracil

A mixture of 126 parts 1-(hexahydro-1-azepinyl) urea, 104 parts of ethyl acetoacetate, 4 parts of p-toluene-sulfonic acid, and 1300 parts of toluene is refluxed for 20 hours, during which time 11.3 parts of water is collected in a Deans-Stark trap. The reaction mixture is cooled, 220 parts of a 29% solution of sodium methoxide in methanol is added, and refluxing is resumed for a period of 3 hours. The reaction mixture is cooled, poured into 1000 parts of ice water and stirred vigorously. The water layer is separated from the organic layer; the sodium salt of 3-(hexahydro-1-azepinyl)-6-methyluracil is extracted with 500 parts of water, and the combined water layers are washed with 250 parts of methylene chloride. Acidification of the water layers with 95 parts of concentrated hydrochloric acid precipitates 3-(hexahydro-1-azepinyl)-6-methyluracil.

The product is isolated by filtration and rinsed twice with 600 parts of water.

Recrystallization from acetonitrile gives pure 3-(hexahydro-1-azepinyl)-6-methyluracil.

By substituting equivalent amounts of the appropriate β-keto ester and urea for the ethyl acetoacetate and 1-

(hexahydro-1-azepinyl)urea set forth above, the following uracils listed in Table I can be made similarly:

100 parts of glacial acetic acid. During the chlorine addition, the temperature is maintained below 30° C. The

TABLE I

| β-keto ester reactant | Substituted urea reactant | Uracil product |
| --- | --- | --- |
| Ethyl propionoacetate | 1-(hexahydro-1-azepinyl)urea | 6-ethyl-3-(hexahydro-1-azepinyl)uracil. |
| Ethyl aceto-α-methylacetate | do | 5,6-dimethyl-3-(hexahydro-1-azepinyl)uracil. |
| Ethyl aceto-α-ethylacetate | do | 5-ethyl-3-(hexahydro-1-azepinyl)-6-methyluracil. |
| 2-carboethoxycyclopentanone | do | 3-(hexahydro-1-azepinyl)-5,6-trimethyleneuracil. |
| 2-carboethoxycyclohexanone | do | Do. |
| Ethyl acetoacetate | 1-(4-morpholino)urea | 6-methyl-3-(4-morpholino)uracil. |
| Ethyl propionoacetate | do | Do. |
| Ethyl aceto-α-fluoroacetate | do | 5-fluoro-6-methyl-3-(4-morpholino)uracil. |
| Ethyl aceto-α-methylacetate | do | 5,6-dimethyl-3-(4-morpholino)uracil. |
| 2-carboethoxycyclopentanone | do | 3-(4-morpholino)-5,6-trimethyleneuracil. |
| Ethyl acetoacetate | 1-(1-piperidino)urea | 6-methyl-3-(1-piperidino)uracil. |
| Ethyl aceto-α-fluoroacetate | do | 5-fluoro-6-methyl-3-(1-piperidino)uracil. |
| Ethyl aceto-α-methylacetate | do | 5,6-dimethyl-3-(1-piperidino)uracil. |
| Ethyl aceto-α-ethylacetate | do | 5-ethyl-6-methyl-3-(1-piperidino)uracil. |
| 2-carboethoxycyclopentanone | 1-(1-piperidino)urea | 3-(1-piperidino)-5,6-trimethyleneuracil. |
| 2-carboethoxycyclohexanone | do | Do. |
| 2-carboethoxycycloheptanone | do | 5,6-pentamethylene-3-(1-piperidino)uracil. |
| Ethyl aceto-α-fluoroacetate | 1-(1-pyrrolidinyl)urea | 5-fluoro-6-methyl-3-(1-pyrrolidinyl)uracil. |
| Ethyl aceto-α-methylacetate | do | 5,6-dimethyl-3-(1-pyrrolidinyl)uracil. |
| Ethyl aceto-α-ethylacetate | do | 5-ethyl-6-methyl-3-(1-pyrrolidinyl)uracil. |
| 2-carboethoxycyclopentanone | do | 3-(1-pyrrolidinyl)-5,6-trimethyleneuracil. |
| 2-carboethoxycyclohexanone | do | 3-(1-pyrrolidinyl)-5,6-tetramethylene uracil. |
| Ethyl aceto-α-methylacetate | 1-(dihydro-1,3,5-dithiazin-5-yl)urea | 5,6-dimethyl-3-(dihydro-1,3,5-dithiazin-5-yl)uracil. |
| Ethyl aceto-α-fluoroacetate | do | 3-(dihydro-1,3,5-dithiazin-5-yl)-5-fluoro-6-methyluracil. |
| Do | 1-(1-aziridinyl)urea | 3-(1-aziridinyl)-5-fluoro-6-methyluracil. |
| Ethyl aceto-α-methylacetate | do | 3-(1-aziridinyl)-5,6-dimethyluracil. |
| Ethyl propiono-α-methylacetate | do | 6-ethyl-3-(2-ethylaziridinyl)-5-methyluracil. |
| Ethyl acetoacetate | 1-(1,2,3,6-tetrahydro-1-pyridyl)urea | 6-methyl-3-(1,2,3,6-tetrahydro-1-pyridyl)uracil. |
| Ethyl aceto-α-methylacetate | 1-(4-methyl-1-piperazinyl)urea | 5,6-dimethyl-3-(4-methyl-1-piperazinyl)-uracil. |
| Do | 1-(1,2,3,6-tetrahydro-1-pyridyl)urea | 5,6-dimethyl-3-(1,2,3,6-tetrahydro-1-pyridyl)uracil. |
| Ethyl aceto-α-fluoroacetate | 1-(1,2,3,6-tetrahydro-1-pyridyl)urea | 5-fluoro-6-methyl-3-(1,2,3,6-tetrahydro-1-pyridyl)uracil. |
| Ethyl aceto-α-ethylacetate | 1-(4-methyl-1-piperazinyl)urea | 5-ethyl-6-methyl-3-(4-methyl-1-piperazinyl)uracil. |
| Ethyl aceto-α-fluoroacetate | do | Do. |
| Ethyl aceto-α-methylacetate | 1-(2,5-dimethyl-4-morpholino)urea | 5,6-dimethyl-3-(2,5-dimethyl-4-morpholino)-uracil. |
| Ethyl acetoacetate | do | 3-(2,5-dimethyl-4-morpholino)6-methyluracil. |
| Ethyl aceto-α-methylacetate | 1-(2-methyl-1-piperidino)urea | 5,6-dimethyl-3-(2-methyl-1-piperidino)-uracil. |
| Ethyl aceto-α-fluoroacetate | do | 5-fluoro-6-methyl-3-(2-methyl-1-piperidino)uracil. |
| Ethyl propionoacetate | 1-(1-piperazinyl)urea | 6-ethyl-3-(1-piperazinyl)uracil. |
| Ethyl acetoacetate | 1-(2-methyl-4-pyrazolin-1-yl)urea | 6-methyl-3-(2-methyl-4-pyrazolin-1-yl)uracil. |
| Ethyl aceto-α-ethylacetate | do | 5-ethyl-6-methyl-3-(2-methyl-4-pyrazolin-1-yl)uracil. |
| Ethyl aceto-α-fluoroacetate | do | 5-fluoro-6-methyl-3-(2-methyl-4-pyrazolin-1-yl)uracil. |
| Ethyl acetoacetate | 1-(tetrahydro-1,4-thiazin-4-yl)urea | 6-methyl-3-(tetrahydro-1,4-thiazin-4-yl)uracil. |
| Ethyl propiono-α-methylacetate | do | 6-ethyl-5-methyl-3-(tetrahydro-1,4-thiazin-4-yl)uracil. |
| Ethyl aceto-α-fluoroacetate | do | 5-fluoro-6-methyl-3-(tetrahydro-1,4-thiazin-4-yl)uracil. |
| Ethyl aceto-α-methylacetate | 1-(dihydro-1,3,5-dioxazin-5-yl)urea | 3-(dihydro-1,3,5-dioxazin-5-yl)-5,6-dimethyluracil. |
| Ethyl acetoacetate | do | 3-(dihydro-1,3,5-dioxazin-5-yl)-6-methyluracil. |
| Do | 1-(1,2,3,4-tetrahydro-2-isoquinolinyl)urea | 6-methyl-3-(1,2,3,4-tetrahydro-2-isoquinolinyl)uracil. |
| Ethyl aceto-α-ethylacetate | 1-[4-(2-hydroxyethyl)-1-piperazinyl]urea | 5-ethyl-3-[4-(2-hydroxyethyl)-1-piperazinyl]-6-methyluracil. |
| Ethyl aceto-α-fluoroacetate | do | 5-fluoro-3-[4-(2-hydroxyethyl)-1-piperazinyl]-6-methyluracil. |
| 2-carboethoxycyclopentanone | 1-(2-methyl-4-pyrazolin-1-yl)urea | 3-(2-methyl-4-pyrazolin-1-yl)-5,6-trimethyleneuracil. |
| Do | 1-(tetrahydro-1,4-thiazin-4-yl)urea | 3-(tetrahydro-1,4-thiazin-4-yl)-5,6-trimethyleneuracil. |
| Do | 1-(dihydro-1,3,5-dioxazin-5-yl)urea | 3-(dihydro-1,3,5-dioxazin-5-yl)-5,6-trimethyleneuracil. |
| Do | 1-[4-(2-hydroxyethyl)-1-piperazinyl]urea | 3-[4-(2-hydroxyethyl)-1-piperazinyl]-5,6-trimethyleneuracil. |
| Do | 1-(2-methyl-1-piperidino)urea | 3-(2-methyl-1-piperidino)-5,6-trimethyleneuracil. |
| Do | 1-(2,5-dimethyl-4-morpholino)urea | 3-(2,5-dimethyl-4-morpholino)-5,6-trimethyleneuracil. |
| Do | 1-(dihydro-1,3,5-dithiazin-5-yl)urea | 3-(dihydro-1,3,5-dithiazin-5-yl)-5,6-trimethyleneuracil. |
| Do | 1-(2-methylaziridinyl)urea | 3-[1-(2-methylaziridinyl)]-5,6-trimethyleneuracil. |
| Do | 1-(1,2,3,6-tetrahydro-1-pyridyl)urea | 3-(1,2,3,6-tetrahydro-1-pyridyl)-5,6-trimethyleneuracil. |
| Ethyl acetoacetate | 1-[3-azabicyclo(3.2.2)nonan-3-yl]urea | 3-[azabicyclo(3.2.2)nonan-3-yl]-6-methyluracil. |
| Do | 1-(1-benzimidazolyl)urea | 3-(1-benzimidazolyl)-6-methyluracil. |
| Do | 1-(4-hydroxy-4-pipecolin-4-yl)urea | 3-(4-hydroxy-4-pipecolin-4-yl)-6-methyluracil. |
| Do | 1-(2,5-dimethylpiperazin-1-yl)urea | 3-(2,5-dimethylpiperazin-1-yl)-6-methyluracil. |
| Do | 1-(4-hydroxypiperidin-1-yl)urea | 3-(4-hydroxypiperidin-1-yl)-6-methyluracil. |
| Do | 1-(3-hydroxypiperidin-1-yl)urea | 3-(3-hydroxypiperidin-1-yl)-6-methyluracil. |
| Do | 1-(2-methyl-2-pyrrolidin-1-yl-propanol)urea | 3-(2-methyl-2-pyrrolidin-1-ylpropanol)-6-methyluracil. |
| Do | 3-[2-(2-hydroxy-1,1-dimethylethyl)-1-pyrrolidinyl]urea | 3-[2-(2-hydroxy-1-dimethylethyl)-1-pyrrolidinyl]-6-methyluracil. |
| Do | 1-(1-aziridinyl)urea | 3-(1-aziridinyl)-6-methyluracil. |
| Do | 1-(dihydro-2,4,6-trimethyl-1,3,5-dithiazin-5-yl)urea | 3-(dihydro-2,4,6-trimethyl-1,3,5-dithiazin-5-yl)-6-methyluracil. |
| Ethyl 2-methylacetoacetate | do | 3-(dihydro-2,4,6-trimethyl-1,3,5-dithiazin-5-yl)-5,6-dimethyluracil. |
| Ethyl acetoacetate | 1-(octahydro-1-azocin-yl)urea | 3-(octahydro-1-azocinyl)-6-methyluracil. |
| Do | 1-(1-azepinyl)urea | 3-(1-azepinyl)-6-methyluracil. |
| Do | 1-(decahydro-1-quinolyl)urea | 3-(decahydro-1-quinolyl)-6-methyluracil. |
| Do | 1-(11-azabicyclo[4.4.1]undec-11-yl)urea | 3-(11-azabicyclo[4.4.1]undec-11-yl)-6-methyluracil. |
| Do | 1-(11-azabicyclo[4.4.1]undec-1-en-11-yl)urea | 3-(11-azabicyclo[4.4.1]undec-1-en-11-yl)-6-methyluracil. |
| Do | 1-(2-methyl-3-oxazolidinyl)urea | 6-methyl-3-(2-methyl-3-oxazolidinyl)uracil. |
| Do | 1-(hexahydro-2H-1,5-oxazocin-5-yl)urea | 3-(hexahydro-2H-1,5-oxazocin-5-yl)-6-methyluracil. |
| Do | 1-(4-oxazolin-3-yl)urea | 3-(4-oxazolin-3-yl)-6-methyluracil. |
| Do | 1-(8-oxa-3-azabicyclo[3.2.1]oct-3-yl)urea | 3-(8-oxa-3-azabicyclo[3.2.1]oct-3-yl)-6-methyluracil. |
| Do | 1-(octahydro-2H-1,3-benzoxazin-3-yl)urea | 3-(octahydro-2H-1,3-benzoxazin-3-yl)-6-methyluracil. |
| Do | 1-(3-benzoxazolinyl)urea | 3-(3-benzoxazolinyl)-6-methyluracil. |
| Do | 1-(3,4-dihydro-2H-1,3-benzoxazin-3-yl)urea | 3-(3,4-dihydro-2H-1,3-benzoxazin-3-yl)-6-methyluracil. |
| Do | 1-(2-methylthiazolidin-3-yl)urea | 6-methyl-3-(2-methylthiazolidin-3-yl)uracil. |
| Do | 1-(4-thiazolin-3-yl)urea | 6-methyl-3-(4-thiazolin-3-yl)uracil. |
| Do | 1-(hexahydro-3-benzothiazolinyl)urea | 3-(hexahydro-3-benzothiazolinyl)-6-methyluracil. |
| Do | 1-(3-benzothiazolinyl)urea | 3-(3-benzothiazolinyl)-6-methyluracil. |
| Do | 1-(3,4-dihydro-2H-1,4-benzothiazin-4-yl)urea | 3-(3,4-dihydro-2H-1,4-benzothiazin-4-yl)-6-methyluracil. |

Example 2.—Preparation of 5-chloro-3-(hexahydro-1-azepinyl)-6-methyluracil

Eight parts of chlorine are added gradually to a stirred solution of 22.3 parts of 3-(hexahydro-1-azepinyl)-6-methyluracil, 16 parts of anhydrous sodium acetate, and 75 parts of glacial acetic acid. During the chlorine addition, the temperature is maintained below 30° C. The solution is stirred for ½ hour longer at room temperature after completion of the chlorine addition, and then poured into 200 parts of water. The product which separates is collected and washed with water to give 5-chloro-3-(hexahydro-1-azepinyl)-6-methyluracil.

The following 5-halouracils can be made similarly by substituting an equivalent amount of the appropriate uracil reactants and halogen listed below in Table II for the 3-(hexahydro-1-azepinyl)-6-methyluracil and chlorine set forth above.

6-methyluracil, 100 parts of acetic acid, and 25.4 parts of iodine is stirred at 100° C. as 7.5 parts of fuming nitric acid are gradually added. Upon completion of addition, the solution is refluxed for ½ hour, and then cooled in an ice bath.

TABLE II

| Uracil starting reactants | Parts by weight of halogen | Uracil product obtained |
|---|---|---|
| 6-ethyl-3-(hexahydro-1-azepinyl)-uracil | 8.0 (Cl₂) | 5-chloro-6-ethyl-3-(hexahydro-1-azepinyl)-uracil. |
| 3-(hexahydro-1-azepinyl)-6-methyluracil | 17.0 (Br₂) | 5-bromo-3-(hexahydro-1-azepinyl)-6-methyluracil. |
| 6-methyl-3-(4-morpholino)uracil | 17.0 (Br₂) | 5-bromo-6-methyl-3-(4-morpholino)uracil. |
| Do | 8.0 (Cl₂) | 5-chloro-6-methyl-3-(4-morpholino)uracil. |
| 6-ethyl-3-(4-morpholino)uracil | 17.0 (Br₂) | 5-bromo-6-ethyl-3-(4-morpholino)uracil. |
| 6-methyl-3-(1-piperidino)uracil | 17.0 (Br₂) | 5-bromo-6-methyl-3-(1-piperidino)uracil. |
| Do | 8.0 (Cl₂) | 5-chloro-6-methyl-3-(1-piperidino)uracil. |
| 6-methyl-3-(1-pyrrolidinyl)uracil | 17.0 (Br₂) | 5-bromo-6-methyl-3-(1-pyrrolidinyl)uracil. |
| Do | 8.0 (Cl₂) | 5-chloro-6-methyl-3-(1-pyrrolidinyl)uracil. |
| 3-(dihydro-1,3,5-dithiazin-5-yl)-6-methyluracil | 17.0 (Br₂) | 5-bromo-3-(dihydro-1,3,5-dithiazin-5-yl)-6-methyluracil. |
| Do | 8.0 (Cl₂) | 5-chloro-3-(dihydro-1,3,5-dithiazin-5-yl)-6-methyluracil. |
| 6-methyl-3-[3-azabicyclo(3-2-2)-nonan-3-yl]uracil | 17.0 (Br₂) | 5-bromo-6-methyl-3-[3-azabicyclo(3.2.2)-nonan-3-yl]uracil. |
| 6-methyl-3-(1,2,3,6-tetrahydro-1-pyridyl)uracil | 17.0 (Br₂) | 5-bromo-6-methyl-3-(1,2,3,6-tetrahydro-1-pyridyl)uracil. |
| Do | 8.0 (Cl₂) | 5-chloro-6-methyl-3-(1,2,3,6-tetrahydro-1-pyridyl)uracil. |
| 6-methyl-3-(4-methyl-1-piperazinyl)-uracil | 8.0 (Cl₂) | 5-chloro-6-methyl-3-(4-methyl-1-piperazinyl)-uracil. |
| 3-(2,5-dimethyl-4-morpholino)-6-methyluracil | 17.0 (Br₂) | 5-bromo-6-methyl-3-(2,5-dimethyl-4-morpholino)uracil. |
| Do | 8.0 (Cl₂) | 5-chloro-6-methyl-3-(2,5-dimethyl-4-morpholino)uracil. |
| 6-methyl-3-(2-methyl-1-piperidino)uracil | 17.0 (Br₂) | 5-bromo-6-methyl-3-(2-methyl-1-piperidino)uracil. |
| 6-methyl-3-(1-piperazinyl)uracil | 17.0 (Br₂) | 5-bromo-6-methyl-3-(1-piperazinyl)uracil. |
| 6-methyl-3-(2-methyl-4-pyrazolin-1-yl)uracil | 17.0 (Br₂) | 5-bromo-6-methyl-3-(2-methyl-4-pyrazolin-1-yl)uracil. |
| Do | 8.0 (Cl₂) | 5-chloro-6-methyl-3-(2-methyl-4-pyrazolin-1-yl)uracil. |
| 6-methyl-3-(tetrahydro-1,4-thiazin-4-yl)uracil | 8.0 (Cl₂) | 5-chloro-6-methyl-3-(tetrahydro-1,4-thiazin-4-yl)uracil. |
| Do | 17.0 (Br₂) | 5-bromo-6-methyl-3-(tetrahydro-1,4-thiazin-4-yl)uracil. |
| 6-methyl-3-(1,2,3,4-tetrahydro-2-isoquinolinyl)uracil | 17.0 (Br₂) | 5-bromo-6-methyl-3-(1,2,3,4-tetrahydro-2-isoquinolinyl)uracil. |
| 3-(dihydro-1,3,5-diaxazin-5-yl)-6-methyluracil | 17.0 (Br₂) | 5-bromo-3-(dihydro-1,3,5-dioxazin-5-yl)-6-methyluracil. |
| 3-[4-(2-hydroxyethyl)-1-piperazinyl]-6-methyluracil | 17.0 (Br₂) | 5-bromo-3-[4-(2-hydroxyethyl)-1-piperazinyl]-6-methyluracil. |
| 3-(3-hydroxypiperidin-1-yl)-6-methyluracil | 17.0 (Br₂) | 5-bromo-3-(3-hydroxypiperidin-1-yl)-6-methyluracil. |
| 3-[2-(2-hydroxy-1,1-dimethylethyl)-1-pyrrolidinyl]-6-methyluracil | 17.0 (Br₂) | 5-bromo-3-[2-(2-hydroxy-1,1-dimethylethyl)-1-pyrrollidinyl]-6-methyluracil. |
| 6-methyl-3 (2,3,5,6 tetramethyl-piperazin-1-yl)uracil | 17.0 (Br₂) | 5-bromo-6-methyl-3-(2,3,5,6-tetramethyl-piperazin-1-yl)uracil. |
| 3-(benzimidazol-1-yl)-6-methyluracil | 17.0 (Br₂) | 3-(benzimidazol-1-yl)-5-bromo-6-methyluracil. |
| 3-(octahydro-1-azocinyl)-6-methyluracil | 8.0 (Cl₂) | 5-chloro-3-(octahydro-1-azocinyl)-6-methyluracil. |
| 3-(decahydro-1-quinolyl)-6-methyluracil | 17.0 (Br₂) | 5-bromo-3-(decahydro-1-quinolyl)-6-methyluracil. |
| 3-(11-azabicyclo[4.4.1]-undec-11-yl)-6-methyluracil | 17.0 (Br₂) | 3-(11-azabicyclo[4.4.1]undec-11-yl)-5-bromo-6-methyluracil. |
| 6-methyl-3-(2-methyl-3-oxazolidinyl)uracil | 8.0 (Cl₂) | 5-chloro-6-methyl-3-(2-methyl-3-oxazolidinyl)uracil. |
| 3-(hexahydro-2H-1,5-oxazocin-5-yl)-6-methyluracil | 8.0 (Cl₂) | 5-chloro-3-(hexahydro-2H-1,5-oxazocin-5-yl)-6-methyluracil. |
| 3-(4-oxazolin-3-yl)-6-methyluracil | 8.0 (Cl₂) | 5-chloro-3-(4-oxazolin-3-yl)-6-methyluracil. |
| 3-(8-oxa-3-azabicyclo-[3.2.1]-oct-3-yl)-6-methyluracil | 17.0 (Br₂) | 5-bromo-3-(8-oxa-3-azabicyclo-[3.2.1]-oct-3-yl)-6-methyluracil. |
| 3-(octahydro-2H-1,3-benzoxazin-3-yl)-6-methyluracil | 17.0 (Br₂) | 5-bromo-3-(octahydro-2H-1,3-benzoxazin-3-yl)-6-methyluracil. |
| 3-(3-benzoxazolinyl)-6-methyl-uracil | 8.0 (Cl₂) | 3-(3-benzoxazolinyl)-5-chloro-6-methyluracil. |
| 3-(3,4-dihydro-2H-1,3-benzoxazin-3-yl)-6-methyl-uracil | 8.0 (Cl₂) | 5-chloro-3-(3 4-dihydro-2H-1,3-benzoxazin-3-yl)-6-methyluracil. |

Example 3.—Preparation of 3-(hexahydro-1-azepinyl)-5-hydroxymethyl-6-methyluracil A mixture of 22.3 parts of 3-(hexahydro-1-azepinyl)-6-methyluracil, 140 parts of water, 32 parts of ethyl alcohol, 6.6 parts of paraformaldehyde, and 2 parts of barium hydroxide is heated until all the components are completely dissolved. The solution is then stripped, and the oil which remains is extracted with ether. The ether extract is dried over magnesium sulfate, filtered and the ether removed to yield 3-(hexahydro-1-azepinyl)-5-hydroxymethyl-6-methyluracil.

The following 5-hydroxymethyluracils can be made similarly by substituting an equivalent amount of the appropriate uracil reactant listed in Table III for the 3-(hexahydro-1-azepinyl)-6-methyluracil set forth above.

Excess iodine which precipitates is removed by filtration, and the filtrate is diluted with 400 parts of cold water. The remaining iodine in the mixture is reduced to iodine ion by adding a sufficient quantity of a saturated, aqueous solution of sodium bisulfite to render the solution colorless.

The aqueous mixture is extracted with 800 parts of methylene chloride. The organic layer is separated, washed with saturated sodium bicarbonate solution, and then dried with magnesium sulfate.

Removal of the methylene chloride leaves 3-(hexahydro-1-azepinyl)-5-iodo-6-methyluracil.

The following 5-iodo uracils can be prepared similarly

TABLE III

| Uracil reactant | Uracil product obtained |
|---|---|
| 6-methyl-3-(4-morpholino)uracil | 5-hydroxymethyl-6-methyl-3-(4-morpholino)uracil. |
| 6-methyl-3-(1-piperidino)uracil | 5-hydroxymethyl-6-methyl-3-(1-piperidino)uracil. |
| 6-methyl-3-(1-pyrrolidinyl)uracil | 5-hydroxymethyl-6-methyl-3-(1-pyrrolidinyl)uracil. |
| 3-(4-methyl-1-piperazinyl)-6-methyluracil | 5-hydroxymethyl-3-(4-methyl-1-piperazinyl)-6-methyluracil. |
| 3-(2,5-dimethyl-4-morpholino)-6-methyluracil | 5-hydroxymethyl-3-(2,5-dimethyl-4-morpholino)-6-methyluracil. |
| 3-(2-methyl-1-piperidino)-6-methyl-uracil | 5-hydroxymethyl-3-(2-methyl-1-piperidino)-6-methyluracil. |
| 6-methyl-3-(1-piperazinyl)uracil | 5-hydroxymethyl-6-methyl-3-(1-piperazinyl)uracil. |
| 6-methyl-3-(2-methyl-4-pyrazolin-1-yl)uracil | 5-hydroxymethyl-6-methyl-3-(2-methyl-4-pyrazolin-1-yl)uracil. |
| 6-methyl-3-(tetrahydro-1,4-thiazin-4-yl)-uracil | 5-hydroxymethyl-6-methyl-3-(tetrahydro-1,4-thiazin-4-yl)uracil. |
| 3-(dihydro-1,3,5-dioxazin-5-yl)-6-methyluracil | 5-hydroxymethyl-3-(dihydro-1,3,5-dioxazin-5-yl)-6-methyluracil. |
| 6-methyl-3-(1,2,3,4-tetrahydro-2-isoquinolinyl)uracil | 5-hydroxymethyl-6-methyl-3-(1,2,3,4-tetrahydro-2-isoquinolinyl)uracil. |
| 3-[4-(2-hydroxyethyl)-1-piperazinyl]-6-methyluracil | 5-hydroxymethyl-3-[4-(2-hydroxyethyl)-1-piperazinyl]-6-methyluracil. |
| 3-(dihydro-1,3,5-dithiazin-5-yl)-6-methyluracil | 3-(dihydro-1,3,5-dithiazin-5-yl)-5-hydroxymethyl-6-methyluracil. |
| 3-[3-azabicyclo(3.2.2)nonan-3-yl]-6-methyluracil | 3-[3-azabicyclo(3.2.2)nonan-3-yl]-5-hydroxymethyl-6-methyluracil. |
| 6-methyl-3-(1,2,3,6-tetrahydro-1-pyridyl)uracil | 5-hydroxymethyl-6-methyl-3-(1,2,3,6-tetrahydro-1-pyridyl)uracil. |
| 3-(dihydro-2,4,6-trimethyl-1,3,5-dithiazin-5-yl)-6-methyluracil | 3-(dihydro-2,4,6-trimethyl-1,3,5-dithiazin-5-yl)-5-hydroxymethyl-6-methyluracil. |
| 3-(11-azabicyclo[4.4.1]undec-1-en-11-yl)-6-methyluracil | 3-(11-azabicyclo[4.4.1]undec-1-en-11-yl)-5-hydroxymethyl-6-methyluracil. |
| 6-methyl-3-(4-thiazolin-3-yl)-uracil | 5-hydroxymethyl-6-methyl-3-(4-thiazolin-3-yl)uracil. |
| 3-(3,4-dihydro-2H-1,4-benzothiazin-4-yl)-6-methyluracil | 3-(3,4-dihydro-2H-1,4-benzothiazin-4-yl)-5-hydroxymethyl-6-methyluracil. |

Example 4.—Preparation of 3-(hexahydro-1-azepinyl)-5-iodo-6-methyluracil

A mixture of 22.3 parts of 3-(hexahydro-1-azepinyl)- by substituting an equivalent amount of the reactant uracils listed in Table IV below one at a time for the 3-(hexahydro-1-azepinyl)-6-methyluracil set forth above.

TABLE IV

| Uracil reactant | Uracil product obtained |
|---|---|
| 6-methyl-3-(4-morpholino)uracil | 5-iodo-6-methyl-3-(4-morpholino)uracil. |
| 6-methyl-3-(1-piperidino)uracil | 5-iodo-6-methyl-3-(1-piperidino)uracil. |
| 6-methyl-3-(1-pyrrolidinyl)uracil | 5-iodo-6-methyl-3-(1-pyrrolidinyl)uracil. |
| 3-(4-methyl-1-piperazinyl)-6-methyluracil | 5-iodo-3-(4-methyl-1-piperazinyl)-6-methyluracil. |
| 3-(2,5-dimethyl-4-morpholino)-6-methyluracil | 3-(2,5-dimethyl-4-morpholino)-5-iodo-6-methyluracil. |
| 3-(2-methyl-1-piperidino)-6-methyluracil | 5-iodo-3-(2-methyl-1-piperidino)-6-methyluracil. |
| 6-methyl-3-(1-piperazinyl)uracil | 5-iodo-6-methyl-3-(1-piperazinyl)uracil. |
| 6-methyl-3-(2-methyl-4-pyrazolin-1-yl)uracil | 5-iodo-6-methyl-3-(2-methyl-4-pyrazolin-1-yl)uracil. |
| 6-methyl-3-(tetrahydro-1,4-thiazin-4-yl)uracil | 5-iodo-6-methyl-3-(tetrahydro-1,4-thiazin-4-yl)uracil. |
| 3-(dihydro-1,3,5-dioxazin-5-yl)-6-methyluracil | 3-(dihydro-1,3,5-dioxazin-5-yl)-5-iodo-6-methyluracil. |
| 6-methyl-3-(1,2,3,4-tetrahydro-2-isoquinolinyl)uracil | 5-iodo-6-methyl-3-(1,2,3,4-tetrahydro-2-isoquinolinyl)uracil. |
| 3-[4-(2-hydroxyethyl)-1-piperazinyl]-6-methyluracil | 3-[4-(2-hydroxyethyl)-1-piperazinyl]-5-iodo-6-methyluracil. |
| 3-(dihydro-1,3,5-dithiazin-5-yl)-6-methyluracil | 3-(dihydro-1,3,5-dithiazin-5-yl)-5-iodo-6-methyluracil. |
| 6-methyl-3-(1-pyrrolyl)uracil | 5-iodo-6-methyl-3-(1 pyrrolyl)uracil. |
| 6 methyl-3-(1,2,3,6-tetrahydro-1-pyridyl)uracil | 5-iodo-6-methyl-3-(1,2,3,6-tetrahydro-1-pyridyl)uracil. |

Example 5.—Preparation of 3-(hexahydro-1-azepinyl)-5-methoxymethyl-6-methyluracil A mixture of 22.3 parts of 3-(hexahydro-1-azepinyl)-6-methyluracil, 140 parts of water, 38 parts of ethyl alcohol 6.6 parts of para-formaldehyde, and 2 parts of barium hydroxide is heated and stirred at reflux for ½ hour. The solution is cooled in an ice bath, neutralized with dilute hydrochloric acid, and stripped free of water and alcohol under reduced pressure.

The residue is stirred with 50 parts of methanol, and the solution is filtered to remove inorganic salts. One part of chloroacetic acid is added to the solution. The reactants are charged to a bomb, and heated at 125° C. for 6 hours. The reaction mixture is heated for several minutes with 1 part of decolorizing charcoal, filtered hot, and stripped free of solvent under reduced pressure to yield 3-hexahydro-1-azepinyl-5-methoxymethyl-6-methyluracil.

The following 5-alkoxymethyluracils can be made similarly by substituting an equivalent amount of the uracil reactants and alcohols listed in Table V for the 3-(hexahydro-1-azepinyl)-6-methyluracil and methanol set forth above:

TABLE V

| Uracil reactant | Alcohol reactant | Uracil product obtained |
|---|---|---|
| 6-methyl-3-(4-morpholino)uracil | $C_2H_5OH$ | 5-ethoxymethyl-6-methyl-3-(4-morpholino)uracil. |
| 6-methyl-3-(1-piperidino)uracil | $C_3H_7OH$ | 6-methyl-3-(1-piperidino)-5-propoxy-methyluracil. |
| 3-(4-methyl-1-piperazinyl)-6-methyluracil | $C_2H_5OH$ | 5-ethoxymethyl-3-(4-methyl-1-piperazinyl)-6-methyluracil. |
| 3-(2,5-dimethyl-4-morpholino)-6-methyluracil | $CH_3OH$ | 3-(2,5-dimethyl-4-morpholino)-5-methoxymethyl-6-methyluracil. |
| 6-methyl-3-(1-piperazinyl)uracil | $CH_3OH$ | 5-methoxymethyl-6-methyl-3-(1-piperazinyl)uracil. |
| 6-methyl-3-(2-methyl-4-pyrazolin-1-yl)uracil | $CH_3OH$ | 5-methoxymethyl-6-methyl-3-(2-methyl-4-pyrazolin-1-yl)uracil. |
| 6-methyl-3-(tetrahydro-1,4-thiazin-4-yl)uracil | $CH_3OH$ | 5-methoxymethyl-6-methyl-3-(tetrahydro-1,4-thiazin-4-yl)uracil. |
| 3-(dihydro-1,3,5-dioxazin-5-yl)-6-methyluracil | $CH_3OH$ | 3-(dihydro-1,3,5-dioxazin-5-yl)-5-methoxymethyl-6-methyluracil. |
| 6-methyl-3-(1,2,3,4-tetrahydro-2-isoquinolinyl)uracil | $CH_3OH$ | 5-methoxymethyl-6-methyl-3-(1,2,3,4-tetrahydro-2-isoquinolinyl)uracil. |
| 3-[4-(2-hydroxyethyl)-1-piperazinyl]-6-methyluracil | iso-$C_3H_7$ | 3-[4-(2-hydroxyethyl)-1-piperazinyl]-5-iso-propoxymethyl-6-methyluracil. |
| 3-(dihydro-1,3,5-dithiazin-5-yl)-6-methyluracil | $CH_3OH$ | 3-(dihydro-1,3,5-dithiazin-5-yl)-5-methoxymethyl-6-methyluracil. |
| 3-(hexahydro-1,4-diazepin-1-yl)-6-methyluracil | $CH_3OH$ | 3-(hexahydro-1,4-diazepin-1-yl)-5-methoxymethyl-6-methyluracil. |
| 6-methyl-3-(1,2,3,6-tetrahydro-1-pyridyl)uracil | $CH_3OH$ | 5-methoxymethyl-6-methyl-3-(1,2,3,6-tetrahydro-1-pyridyl)uracil. |
| 6-methyl-3-(2-methyl-thiazolidin-3-yl)uracil | $CH_3OH$ | 5-methoxymethyl-6-methyl-3-(2-methyl-thiazolidin-3-yl)uracil. |
| 3-(hexahydro-3-benzothiazolinyl)-6-methyluracil | $CH_3OH$ | 3-(hexahydro-3-benzothiazolinyl)-5-methoxymethyl-6-methyluracil. |
| 3-(3-benzothiazolinyl)-6-methyluracil | $CH_3OH$ | 3-(3-benzothiazolinyl)-5-methoxymethyl-6-methyluracil. |

Example 6.—Preparation of 5-bromo-3-(hexahydro-1-azepinyl)-6-methyluracil, sodium salt A solution of 4 parts of sodium hydroxide in 150 parts of water is added to 21.7 parts of 5-bromo-3-(hexahydro-1-azepinyl)-6-methyluracil. The suspension is stirred and warmed to effect solution. The water is removed from the solution under reduced pressure, leaving the sodium salt of the uracil as a white solid.

The following metal salts can be prepared similarly by substituting equivalent amounts of other uracils and other metallic hydroxides for the 5-bromo-3-(hexahydro-1-azepinyl)-6-methyluracil and sodium hydroxide set forth above. The following list contains examples of typical salts of the invention:

5-bormo-6-methyl-3-(4-morpholino)uracil, lithium salt
5-bromo-6-methyl-3-(4-morpholino)uracil, potassium salt
5-bromo-6-methyl-3-(1-piperidino)uracil, sodium salt
5-chloro-6-methyl-3-(1-pyrrolidinyl)uracil, lithium salt
5,6-dimethyl-3-(1-pyrrolidinyl)uracil, potassium salt
3-(4-morpholino)-5,6-trimethyleneuracil, lithium salt
5-bromo-6-methyl-3-(1-pyrrolidinyl)uracil, sodium salt
5-chloro-6-methyl-3-(1-piperidino)uracil, sodium salt
5-iodo-6-methyl-3-(1-pyrrolidinyl)uracil, sodium salt The following examples illustrate preparation and use of formulations incorporating the herbicidally active compounds of the invention.

Example 7

Aqueous solution: Percent
3-(hexahydro-1-azepinyl)-6-methyluracil, sodium salt _____ 5
Sodium lauryl sulfate _____ 2
Water _____ 93

The solution is prepared by dissolving the two soluble salts in the water, with agitation. This solution is suitable for quick dilution to desired spray levels.

This aqueous solution is used for post-emergence weed control. An application of 2 to 3 pounds of active ingredient per acre in 30 gallons of water gives excellent control of crabgrass, pigweed, wild mustard, ryegrass, chickweed, and wild oats.

At concentrations of 2 to 4 pounds (active) per acre in 100 gallons of water, this material gives excellent control of a wide variety of annual and broadleaf weeds growing in railroad yards on railroad ballast.

Example 8

Aqueous suspension: Percent
5 - bromo-3-(hexahydro-1-azepinyl)-6-methyl-uracil _____ 28.0
Sodium lignin sulfonate _____ 15.0
Hydrated attapulgite _____ 2.0
Disodium phosphate _____ 0.8
Sodium pentachlorophenate _____ 0.5
Water _____ 53.7

The above ingredients are mixed and pebble-milled or sand-milled until the average particle size of the active material is substantially less than 5 microns. The resulting stable thixotropic suspension does not cake, and can be readily diluted with water to form a dilute, very slowly settling suspension which requires no agitation during application.

This aqueous suspension, applied as directed spray at 1 to 3 pounds of active ingredient per acre in 30 gallons of water, gives good pre-emergence control of barnyardgrass, wild mustard, green foxtail, and jungle rice-grass in established sugar cane.

Example 9

Aqueous dispersion: Percent
- 6-methyl-3-(1-piperidino)uracil _____ 13.00
- Pentachlorophenol _____ 16.00
- Sodium lignin sulfonate _____ 15.00
- Hydrated attapulgite _____ 1.75
- Water _____ 54.25

This formulation is wet-milled until the particles are substantially all below 10 microns in size, to yield a stable dispersion. An application of 30 pounds per acre (active) of this formulation in 40 gallons of water controls annual and perennial broadleaf and grass weeds such as quackgrass, giant foxtail, ragweed, and lamsquarters growing in fire-breaks in forested areas.

Example 10

Aqueous concentrate: Percent
- 5-bromo-3-(hexahydro-1-azepinyl)-6-methyluracil, potassium salt _____ 10
- Sodium lauryl sulfate _____ 1
- Water _____ 89

The aqueous concentrate is prepared by dissolving the two solid components in water. The concentrate can be easily diluted to use levels and sprayed.

These aqueous concentrates are conveniently applied with a pressure-type hand sprayer. One to two pounds of active ingredient per acre in 40 gallons of water gives excellent pre-emergence control of foxtail, watergrass, and Johnsongrass seedlings in established sugar cane. This formulation, at 40 pounds of active ingredient per acre in 100 gallons of water, provides control of a wide variety of annual and perennial weeds on industrial sites and railroad ballast.

Example 11

Emulsifiable oil: Percent
- 5-bromo-6-methyl-3-(1-piperidino) uracil ____ 20.0
- Alkyl aryl polyester alcohol _____ 2.5
- Oil soluble petroleum sulfonate _____ 2.5
- Isophorone _____ 75.0

The emulsifiable oil is prepared by mixing the above components until a homogeneous solution results. It can then be emulsified in water for application.

This emulsifiable oil is useful for weed control on railroad rights-of-way, in railroad yards, and on sidings. When this composition is diluted with 100 gallons of water per acre and sprayed from a railroad spray car at 10 pounds of active ingredient per acre, mixed vegetation such as quackgrass, crabgrass, Bermudagrass, bromegrass, ragweed, cocklebur, lambsquarters, and marestail is controlled for an extended period.

The emulsion is also highly useful for brush control when extended with water so that 10 pounds is contained in 100 gallons of water. This mixture is sprayed on undesirable brush species such as sweet gum, crab apple, oak, maple, and poplar until the foilage is thoroughly wetted whereupon excellent control of the brush species is obtained.

Example 12

Emulsifiable oil suspension: Percent
- 5-bromo-6-methyl-3-(1-pyrrolidinyl) uracil ____ 25
- Blend or polyalcohol carboxylic acid esters and oil-soluble petroleum sulfonates _____ 6
- Diesel oil _____ 69

The above components are mixed together, and milled in a roller mill, pebble mill, or sand mill until the particles of the active component are substantially all below 10 microns in size. The resulting suspension can be emulsified in water or diluted further with weed oils for spray application.

This formulation is diluted with 80 gallons of Lion Herbicidal Oil—No. 6 and applied at 10 to 20 pounds of active ingredient per acre for the control of weeds such as morningglory, chickweed, pigweed, lambsquarters, yarrow, ragweed, wild carrot, quackgrass witchgrass, crabgrass, and oak and maple seedlings growing along railroad rights-of-way. Excellent control is obtained.

Example 13

Tank mixes (A) Ten pounds of 5-bromo-6-methyl-3-(1-piperidino)-uracil as an 80% wettable powder and 2 pounds of 4,6-dinitro-orthosecondary butylphenol in 4 gallons of oil are blended as a tank mix, and applied at 12 pounds of active herbicide per acre in 100 gallons of water to weeds growing along fence rows. Quick kill of annual and perennial broadleaf and grass weeds is obtained with excellent residual weed control.

(B) Fifteen pounds of an 80% water-dispersible powder formulation of 5-bromo-3-(hexahydro-1-azepinyl)-6-methyluracil and 24 pounds of 2,2-dichloropropionic acid, sodium salt, 85% are dispersed and mixed in 100 gallons of water.

This composition is good for the control of perennial grasses and broadleaf weeds on railroad rights-of-way. An application of 100 gallons of this formulation per acre gives good control of Johnsongrass, Bermudagrass, nutsedge, barnyard grass, crabgrass, plantain, ragweed, and beggarticks.

(C) Nineteen pounds of an 80% water dispersible powder formulation of 5-bromo-6-methyl-3-(1-pyrrolidinyl)uracil and 20 pounds of 2,2-dichloropropionic acid, sodium salt (85%) are dispersed and mixed in 50 to 100 gallons of water. This composition, sprayed on one acre, gives good control of both annual and perennial grasses and broadleaf weeds growing along railroad rights-of-way and around loading dock installations.

Such difficult-to-kill weeds as crabgrass, dock, ragweed, lambsquarters, pigweed, goatweed, carpetweed, beggarticks, Spanishneedle, nightshade, black medic knotweed, plantain, spotted spurge, and velvetleaf are controlled by this application.

(D) Twelve pounds of 5-bromo-6-methyl-3-(1-piperidino)-uracil as an 80% wettable powder and 35 pounds of ammonium sulfamate are blended as a tank mix in 100 gallons of water.

This composition is sprayed on mixed brush species such as gum, viburnum, willow, cedar, oak, and maple infesting a power line right-of-way until the undesirable plants are thoroughly wetted. Good control of these brush species is obtained.

An application of 47 pounds per acre (active) in 100 gallons of water controls annual and perennial broadleaf, and grass weeds, giving rapid contact action and extended residual weed control. Weeds controlled by this treatment include crabgrass, broomsedge, cocklebur, flower-of-an-hour, and oak, maple, and sweet gum seedlings.

SOLID COMPOSITIONS

Example 14

Dusts: Percent
- 3-(hexahydro-1-azepinyl)-6-methyluracil _____ 10.0
- Talc _____ 90

These components are blended and micropulverized until the particles of uracil have been reduced to about 10 microns in diameter, then reblended.

Example 15

Granules: Percent
- 5-bromo-6-methyl-3-(1-pyrrolidinyl)-uracil ____ 5
- Anhydrous sodium sulfate _____ 10
- Non-swelling sub-bentonite clay _____ 85

The compounds are blended and micropulverized, then moistened with water and granulated. The granules are then dried and screened.

The granules are applied conveniently by hand for "spot treatment" of undesirable bunch grasses growing in agricultural areas. An application of 20 pounds of active ingredient per acre gives good control of Muhlenbergia, Orchard, Vasey, and Kentucky 31 fescue grasses.

Example 16

| Pellets: | Percent |
|---|---|
| 5-bromo-6-methyl-3-(1-piperidino) uracil | 25 |
| Anhydrous sodium sulfate | 10 |
| Sodium lignin sulfonate | 10 |
| Ca, Mg bentonite | 55 |

The components are blended and micropulverized, then moistened with 18–20% water and extruded through die holes. The extrusions are cut as formed to give pellets and dried.

These pellets are useful for weed control along highway guard rails, around bridges, cyclone fences, and highway signs. They are applied conveniently by hand methods at 10 to 25 pounds of active ingredient per acre. Excellent control of annual and perennial grasses and broadleaf weeds such as Johnsongrass, Bermudagrass, crabgrass, quackgrass, dogbane, milkweed, veronica, and ragweed is obtained.

Example 17

| Soluble powder: | Percent |
|---|---|
| 5-bromo-6-methyl-3-(4-morpholino)-uracil | 50 |
| Synthetic fine silica | 2 |
| Sodium metasilicate, anhydrous | 25 |
| Potassium chloride | 22 |
| Dioctyl sodium sulfosuccinate | 1 |

The ingredients are blended and micropulverized to give a freeflowing, noncaking powder. When added to a spray tank, the active ingredient dissolves rapidly, leaving only the silica in suspension.

Example 18

| Wettable powder: | Percent |
|---|---|
| 5-bromo-3-(hexahydro-1-axepinyl)-6-methyluracil | 80.0 |
| Sodium lauryl sulfate | 0.6 |
| Sodium lignin sulfonate | 2.0 |
| Kaolin clay | 17.4 |

The components are blended and then micropulverized until the solids are substantially all below 50 microns in particle size. The mixture is then reblended until it is homogeneous.

This wettable powder is used as a general purpose weed killer on industrial sites and railroad ballast. Fifteen to twenty-five pounds of active ingredient per acre in 100 gallons water gives excellent control of marestail, eveningprimrose, pokeweed, oxeye daisy, cocklebur, goosegrass, crabgrass, and lovegrass.

Example 19

| Wettable powder: | Percent |
|---|---|
| 3-piperidino-6-methyluracil | 50 |
| Sodium alkylnaphthalene-sulfonate | 2 |
| Sodium ligninsulfonate | 2 |
| Attapulgite clay | 46 |

The components are blended and then micropulverized until the solids are substantially below 50 microns in particle size. The mixture is reblended until it is homogeneous. Application at a rate of 30 pounds per acre (active) of this formulation in 80 gallons of water controls annual and perennial broadleaf and grass weeds such as quackgrass, giant foxtail, ragweed, and lambsquarters.

The other compounds of this invention set forth in Examples 1 through 6 can be formulated similarly and applied with similar results.

I claim:
1. A compound of the formula

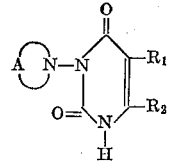

wherein:

is azacycloalkyl of 3 through 8 ring atoms, azacycloalkenyl of 5 through 7 ring atoms, azabicycloalkyl of 7 through 11 ring atoms, diazacycloalkyl of 5 through 8 ring atoms, azabicycloalkenyl of 9 through 11 ring atoms, azaoxacycloalkyl of 5 through 8 ring atoms, diazabicycloalkenyl of 7 through 11 ring atoms, azaoxacycloalkenyl of 5 through 8 ring atoms, azaoxabicycloalkyl of 8 through 10 ring atoms, azaoxabicycloalkenyl of 9 through 11 ring atoms, azadioxacycloalkyl of 5 through 8 ring atoms, azathiacycloalkyl of 5 through 7 ring atoms, azadithiacycloalkyl of 5 through 8 ring atoms, azathiacycloalkenyl of 5 through 7 ring atoms, azathiabicycloalkyl of 9 and 10 ring atoms, or azathiabicycloalkenyl of 9 and 10 ring atoms, provided that one nitrogen atom bonds the group to the uracil nucleus, and further provided the group can be substituted with a member selected from the group consisting of hydroxy, alkyl of 1 through 4 carbon atoms, and hydroxyallyl of 1 through 4 carbon atoms;

$R_1$ is hydrogen, chlorine, bromine, fluorine, iodine, alkyl of 1 through 3 carbon atoms, hydroxymethyl or alkoxymethyl of 2 through 4 carbon atoms;

$R_2$ is methyl or ethyl; provided that $R_1$ and $R_2$ can be joined together as $(CH_2)_n$ where $n$ is an integer from 3 through 5.

2. A compound of the formula:

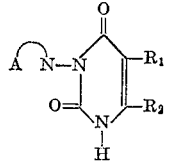

wherein:

is azacycloalkyl of 5 through 7 ring atoms, azaoxacycloalkyl of 5 through 6 ring atoms, or azathiacycloalkyl of 5 through 6 ring atoms, provided that one nitrogen atom bonds the group to the uracil nucleus, and further provided the group can be substituted with 0 through 4 methyl groups;

$R_1$ is hydrogen, chlorine, bromine, fluorine, iodine, alkyl of 1 through 3 carbon atoms, hydroxymethyl or alkoxymethyl of 2 through 4 carbon atoms;

$R_2$ is methyl or ethyl; provided that $R_1$ and $R_2$ can be joined together as $(CH_2)_n$ where $n$ is an integer from 3 through 5.

3. A compound of the formula of claim 1 which is 5-bromo-6-methyl-3-(1-piperidino)uracil.

4. A compound of the formula of claim 1 which is 5-bromo-6-methyl-3-(1-pyrrolidinyl)uracil.

5. A compound of the formula of claim 1 which is 5-bromo-6-methyl-3-(hexahydro-1-azepinyl)uracil.

6. A compound of the formula of claim 1 which is 5-chloro-6-methyl-3-(hexahydro-1-azepinyl)uracil.

No references cited

ALEX MAZEL, Primary Examiner

J. TOVAR, Assistant Examiner

U.S. Cl. X.R.

71—90, 92; 260—241, 242, 243, 244, 247.2, 256.5

UNITED STATES PATENT OFFICE
CERTIFICATE OF CORRECTION

Patent No. 3,466,285      Dated September 25, 1969

Inventor(s) Harvey M. Loux

It is certified that error appears in the above-identified patent and that said Letters Patent are hereby corrected as shown below:

Patent Claim 7 (our Claim 10) was omitted from the above-identified patent.

This claim reads as follows:

-- A compound of the formula of Claim 1 which is 5-bromo-6-methyl-3-(4-morpholino)uracil. --

SIGNED AND
SEALED

DEC 23 1969

(SEAL)
Attest:

Edward M. Fletcher, Jr.
Attesting Officer

WILLIAM E. SCHUYLER, JR.
Commissioner of Patents